United States Patent [19]

Etienne

[11] 4,087,895
[45] May 9, 1978

[54] DEVICE FOR RAPIDLY EXCHANGING AN ACCUMULATOR BATTERY ON AN ELECTRIC VEHICLE

[75] Inventor: Michel Etienne, Valmondois, France

[73] Assignee: Automobiles Peugeot, Paris, France

[21] Appl. No.: 796,653

[22] Filed: May 13, 1977

[30] Foreign Application Priority Data

Jun. 17, 1976 France ............................... 76 18385

[51] Int. Cl.² ........................................... B23P 19/04
[52] U.S. Cl. .................................. 29/252; 254/93 HP
[58] Field of Search .............. 29/252, 244; 254/93 HP

[56] References Cited

U.S. PATENT DOCUMENTS

| 1,745,959 | 2/1930 | Steiner | 254/93 HP |
| 2,070,960 | 2/1937 | Phillips | 254/93 HP |
| 3,174,722 | 3/1965 | Alim | 254/93 HP |

*Primary Examiner*—James L. Jones, Jr.
*Attorney, Agent, or Firm*—Burns, Doane, Swecker & Mathis

[57] ABSTRACT

The device comprises a pallet and a device for rendering the pallet easily movable relative to the ground. A raising device is disposed between the pallet and the battery to be exchanged. A device guides the battery relative to the vehicle and a device hooks and locks the battery to the vehicle.

10 Claims, 3 Drawing Figures

DEVICE FOR RAPIDLY EXCHANGING AN ACCUMULATOR BATTERY ON AN ELECTRIC VEHICLE

The present invention relates to a device for permitting a rapid exchange of an accumulator battery on an electric vehicle.

It is known that the duration of the charging of an accumulator battery is always very long, so that in order to limit the time of immobilization of electric vehicles, it is of interest to be able to rapidly exchange a charged battery for the discharged battery.

Unfortunately, the handling devices employed heretofore for this purpose are particularly complicated and inconvenient to use, above all when it concerns exchanging batteries for heavy vehicles.

An object of the invention is to provide a particularly simple and cheap handling means whereby it is possible to exchange an accumulator battery on a vehicle easily and rapidly irrespective of the angular position of the vehicle.

According to the invention, there is provided a device for rapidly exchanging an accumulator battery on an electric vehicle, said device comprising a pallet, means for rendering said pallet easily movable with respect to the ground, a raising device disposed between said pallet and the battery to be exchanged, means for guiding the battery with respect to the pallet, means for guiding the battery with respect to the vehicle, and means for hooking and locking the battery with respect to the vehicle.

One embodiment will be described hereinafter with reference to the accompanying drawings in which.

Figure 1:
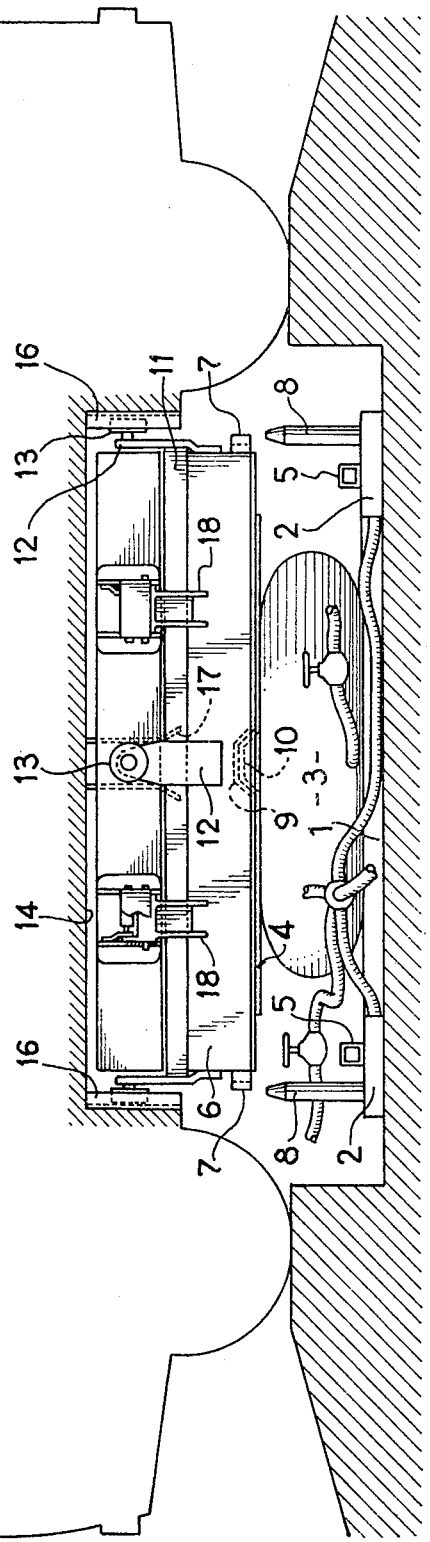
FIG. 1 is an assembly view of the device.

The device shown in FIG. 1 comprises a handling pallet 1 supported by four platforms 2 including air cushions disposed at the corners of the pallet.

Placed on the pallet is a pneumatic jack constituted by an inflatable bag 3 on which a distribution plate 4 is disposed.

The pallet is adapted to receive on blocks 5 a container 6 containing the elements of the accumulator battery.

This container comprises lateral guiding forks 7 which cooperate with vertical rods 8 fixed to the pallet 1.

It also has, in the centre of its lower face, a frustoconical recess 9 which cooperates with a corresponding boss 10 formed in the centre of the plate 4.

The container 6 comprises an upper girdle 11 and tabs 12 provided with rollers 13 disposed laterally in the centre of each side.

The container 6 may be engaged in a suitable recess 14 of a vehicle 15. For this purpose, the vehicle is provided with guides 16 which have a convergent entrance 17 and receive the rollers 13. The vehicle is also provided with hooking means constituted by hooks 18 provided for engaging under the upper girdle 11 of the container 6.

Figure 3:
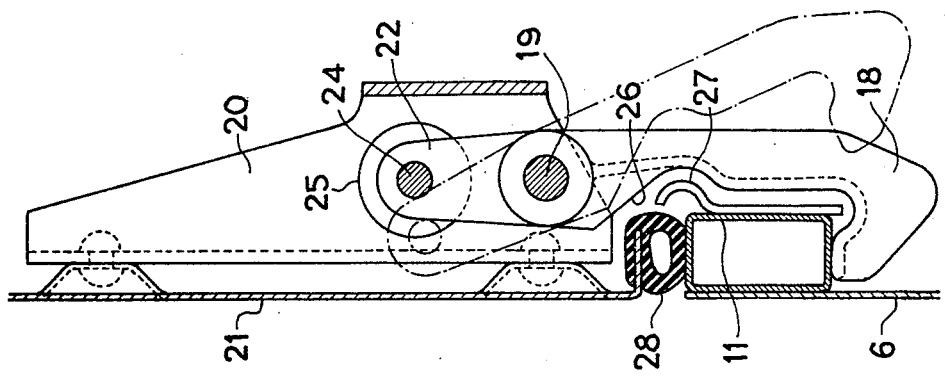
FIGS. 2 and 3 show means for hooking and locking the battery with respect to the vehicle.
Figure 2:
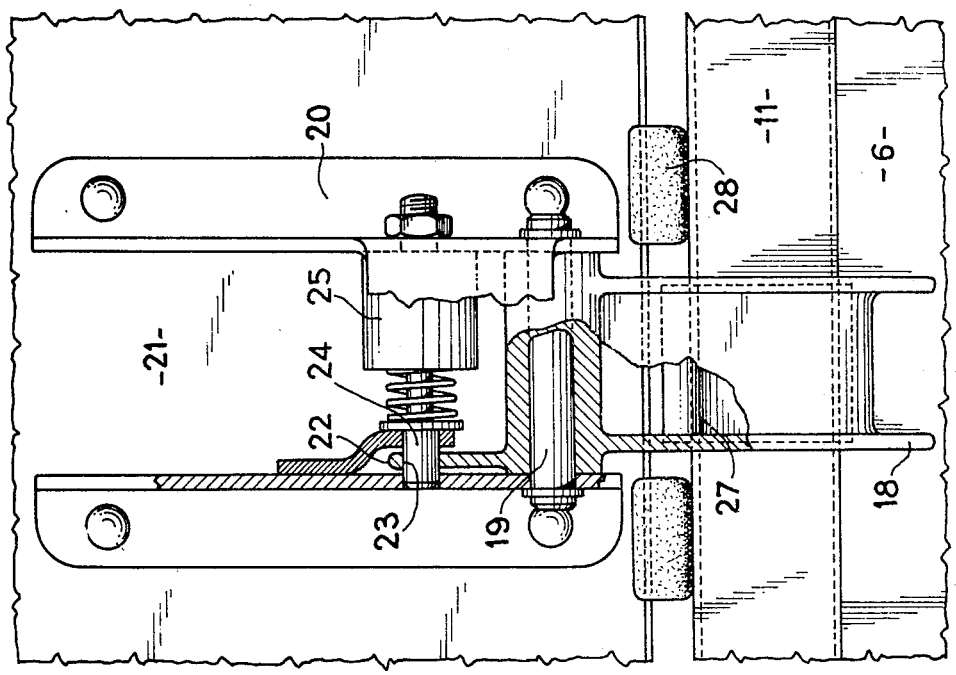

One embodiment of the hooking means is shown in FIGS. 2 and 3.

Each hook 18 is pivotally mounted on a pin 19 carried by a stirrup 20 integral with the chassis 21 of the vehicle. Each hook has a heel portion 22 provided with an orifice 23 in which a locking finger member 24 is engaged, this member being actuated by a pneumatic or electromagnetic device 25, and a ramp 26 on which a finger member 27, carried by the girdle 11 of the container 6, is capable of bearing.

Elastically yieldable means 28 are disposed between the chassis 21 and the girdle 11.

In order to exchange a battery, the following procedure is adopted:

An empty pallet 1 is brought under the vehicle, this pallet being supported by the air cushions formed under the platform 2 and supplied with compressed air.

While the air cushions are allowed to operate, the jack 3 is inflated until the plate 4 bears under the container 6. The pallet 1 is then automatically centered under the container 6 by the engagement of the boss 10 in the recess 9.

As the devices 25 for actuating the locking finger members have been actuated, the hooks 18 are unlocked. The thrust exerted by the jack 3 crushes the elastically yieldable means 28 and the finger members 27 acting on the ramps 26 urge back the hooks 18 which are then maintained in the withdrawn position by the devices 25, as shown in dot-dash lines in FIG. 3.

The jack 3 is then progressively deflated in order to lower the container 6 which is guided, first by the rollers 13 in the guides 16, and then by the forks 7 on the rods 8. When the container 6 bears on the blocks 5, the assembly comprising the pallet and the battery is very easily taken away and placed at a charging station.

Then another pallet provided with a charged battery is brought under the vehicle.

While allowing operation of the air cushions, the jack 3 is inflated so as to raise the container 6. At the start of the travel, the container is guided by the forks 7 on the rods 8 and then by the rollers 13 engaged in the guides 16 which automatically centre the assembly with respect to the recess 14.

At the end of the travel, the hooks 18 are engaged under the girdle 11 and are then locked by the devices 25. It is now merely necessary to empty the jack 3 and discharge the pallet 1.

It can be seen that all these operations can be carried out very easily and rapidly and that the device is completely insensitive to differences of angular position of the vehicle, which may vary from one vehicle to another.

It will be understood that the hooking and locking means have merely been given by way of example, to which the invention is not intended to be limited, and that it is possible to employ any other equivalent means without departing from the scope of the invention.

Having now described my invention what I claim as new and desire to secure by Letters Patent is:

1. A device for rapidly exchanging an accumulator battery on an electric vehicle, said device comprising a pallet, means for rendering said pallet easily movable with respect to the ground, a raising device disposed between said pallet and the battery to be exchanged, means for guiding the battery with respect to the pallet, means for guiding the battery with respect to the vehicle, and means for hooking and locking the battery with respect to the vehicle.

2. A device as claimed in claim 1, wherein said means for rendering said pallet easily movable with respect to the ground comprise a platform and air cushions disposed at the corners of said pallet.

3. A device as claimed in claim 1, wherein the raising device comprises a pneumatic jack formed by an inflatable bag disposed between the pallet and the battery.

4. A device as claimed in claim 1, comprising a container for the battery, said means for guiding the battery with respect to the pallet comprising rods fixed to said pallet and forks which are integral with said container and cooperate with the rods.

5. A device as claimed in claim 4, wherein said means for rendering said pallet easily movable with respect to the ground comprise a platform and air cushions disposed at the corners of said pallet, the raising device comprises a pneumatic jack formed by an inflatable bag disposed between the pallet and the battery and said means for guiding the battery with respect to the vehicle comprise means defining a recess for the battery, tabs disposed on a lateral surface of said container, rollers mounted on an end of the tabs, said rollers being cooperative with guides provided in a lateral wall of said recess.

6. A device as claimed in claim 5, wherein said guides each comprise a convergent entrance which facilitates the penetration of the corresponding roller in said guides.

7. A device as claimed in claim 3, wherein said guide means further comprise means for centering the container with respect to the jack and comprising a distributing plate fixed to a face of the pneumatic jack and adapted to come in contact with the bottom of said container, the container having a base and means on said base for defining a frustoconical recess, and a boss formed in the centre of the distributing plate and capable of engaging in the frustoconical recess.

8. A device as claimed in claim 4, wherein said means for hooking the battery with respect to the vehicle comprise supports which are integral with the vehicle, hooks pivoted on the supports, a girdle provided in the upper part of the container, the hooks being capable of engaging with the girdle and being provided with ramps, and finger members integral with said girdle, the ramps being cooperative with the finger members so as to withdraw said hooks when raising the container.

9. A device as claimed in claim 4, wherein the means for locking the battery with respect to the vehicle comprise an extension of each hook having an orifice, a locking finger member and a pneumatic or electric actuating device for said finger member, the locking finger member being engageable in the orifice formed in said extension.

10. A device as claimed in claim 8, wherein elastically yieldable means are interposed between a face of said girdle opposed to a face thereof which is cooperative with said hooks, and an edge of said recess for said container.

* * * * *